Patented Jan. 6, 1925.

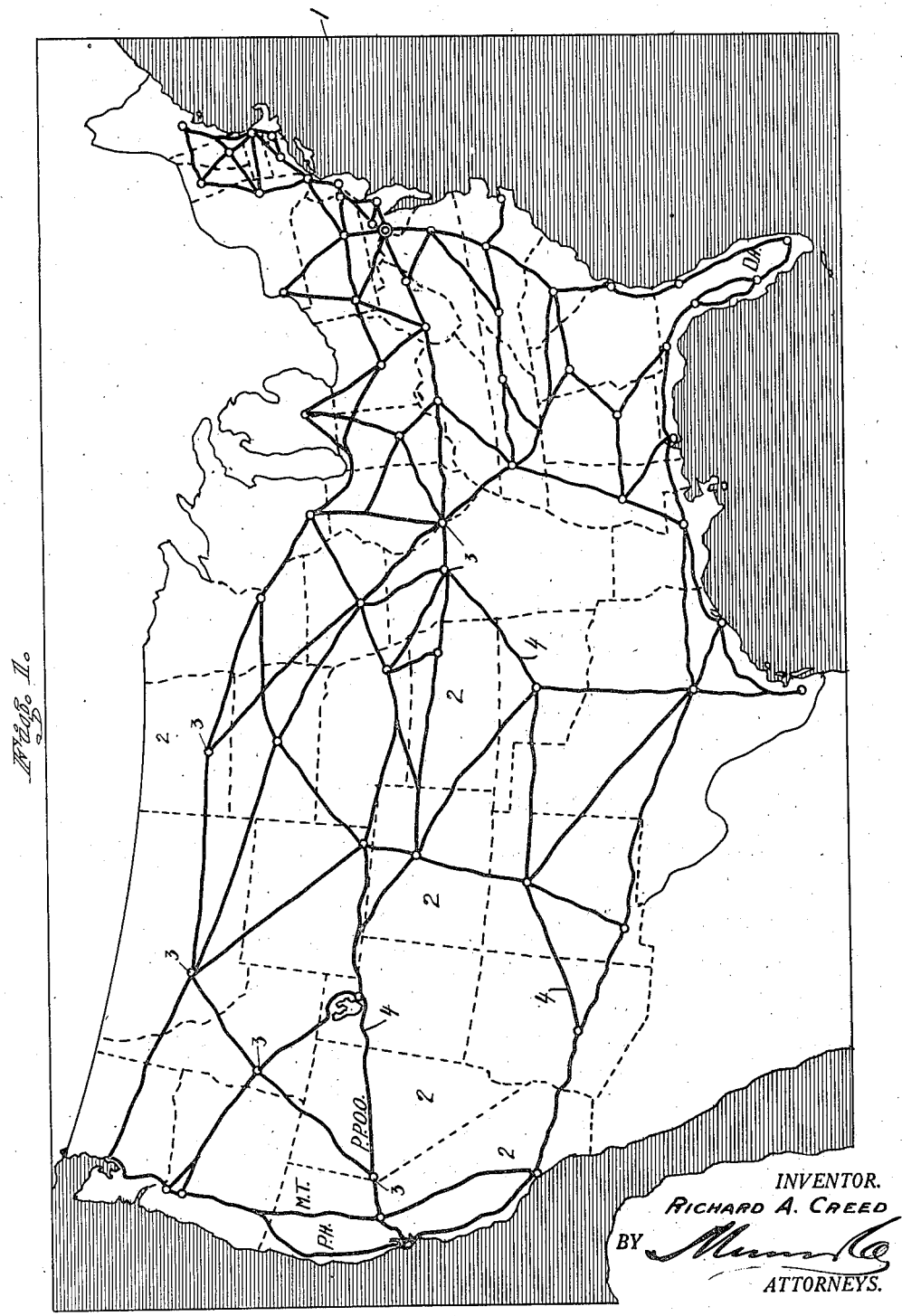

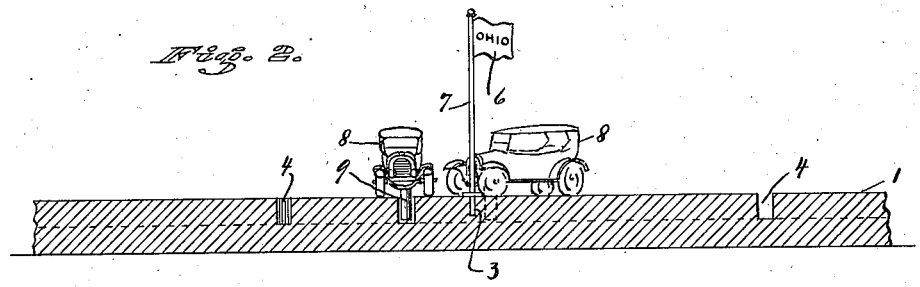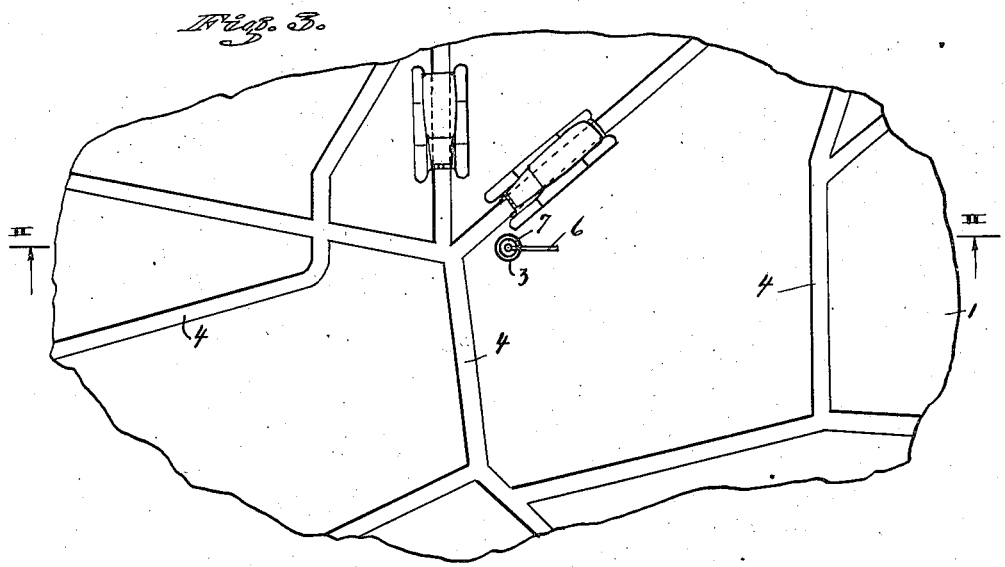

1,522,048

UNITED STATES PATENT OFFICE.

RICHARD A. CREED, OF SAN JOSE, CALIFORNIA, ASSIGNOR TO JESS L. BISHOP, OF SAN JOSE, CALIFORNIA.

GAME.

Application filed July 26, 1922. Serial No. 577,661.

*To all whom it may concern:*

Be it known that I, RICHARD A. CREED, a citizen of the United States, and a resident of San Jose, county of Santa Clara, and State of California, have invented a new and useful Game, of which the following is a specification.

The present invention relates to improvements in games and has particular reference to a traffic game designed to present educational features besides being of supreme interest to children as well as to grown-ups. The game is of a geographical nature and besides taxing the ingenuity of the players in finding the quickest way of getting to a desired place it forces them to become thoroughly familiar with the geography of the country selected for the purposes of the game.

With these objects in view I have illustrated the preferred form of the invention in the accompanying drawings in which—

Figure 1 shows a top plan view of a board on which the game is to be played, Figure 2 an enlarged partial cross-section through the same and Figure 3 an enlarged top plan view of a small portion of the board. While only the preferred form of the invention is shown in the drawings it should be understood that various changes or modifications may be made within the scope of the claims hereto attached without departing from the spirit of the invention.

The board (1) which may be of any suitable material best adapted for the purpose hereinafter set forth is made to represent the map of a certain country. For the purpose of this description the map of the United States has been selected, although it should be understood that the map of any other political or geographical unit might be substituted. It is left optional with the manufacturer just how far he wishes to go in the representation of the details of the map but certain geographical or political subdivisions of the country should be indicated as in the example shown: the various States (2) forming the political subdivisions of the United States and the capitals (3) and other principal cities of each State should be shown in their proper positions. In the example selected it is assumed that the automobile roads of the country will be of the greatest interest to the players and the board is therefore provided with a plurality of intersecting grooves (4) representing the principal roads or highways of the country. The names of these various roads are preferably indicated on the board by their initials, as for instance, P. H. is for Pacific Highway, P. P. O. O. for Pike's Peak Ocean to Ocean, M. T. for Midland Trail, D. H. for Dixie Highway and so on. It should be understood, of course, that railroad lines or electrical lines, etc., might be substituted for the highways.

For each State a flag (6) is provided which preferably carries the name of the State on both sides and the pole (7) of which is adapted to be inserted in the cylindrical holes (3) representing the various capitals of the States or geographical subdivisions. The game is preferably played by two opponents, each being furnished with a toy motor vehicle (8) which latter is provided with a downwardly extending pin (9) adapted to slidably engage and to ride in any of the grooves (4). The motor vehicles may be advanced in the grooves in any suitable manner.

The rules of the game are preferably as follows: Each State or political subdivision is represented by a flag and at the beginning of the game the flags are evenly distributed between the two players. Each player then selects a point of operation for his opponent, in what seems to him the most unfavorable place and the opponent's flags are disposed there. The problem with which the two opponents are confronted is to take the flags to the capitals of their representative States in single trips, that is, one trip for each flag and he who succeeds in getting disposed of all of his flags first is the winner.

Each flag must be placed into the hole provided to indicate a capital and if the capital happens to be on the highway or right close to it a flag previously placed will constitute an obstacle for a later trip along the same road. To overcome these obstacles the player has to stop, take out the flag, pass and replace the flag. To avoid this operation as much as possible each player will of course, try to arrange his trips in such a manner as not to encounter any of these obstacles, or as few as possible. while at the same time it is in his interest to arrange his trips to provide as many obstacles as possible for his opponent, all of which calls for considerable skill and forethought.

If the two motor vehicles of the two opponents should meet on the same highway the one who happens to be closest to the nearest crossing has to return to that point, giving his opponent an opportunity to pass him and then resume his trip, which latter rule requires considerable skill on the part of the players in determining whether or not he is going to meet his opponent.

The flag representing the whole country may be made larger than the others and has to be placed on the capital of the country or Washington, D. C., in the example selected.

It will be seen from the foregoing description that this game offers interesting features for young and old and is particularly adapted to make the player familiar with the geography of his country and especially with those features he may be particularly interested in, as for instance, the automobile roads.

I claim:

1. In a game of the character described, a board having a plurality of intersecting guide lines therein corresponding in their arrangement with certain lines on a map and having a plurality of territorial subdivisions marked thereon, a flag for each subdivision, and toy vehicles adapted to be forwarded along said guide lines for the purpose of transferring the flags to their respective subdivisions.

2. In a game of the character described, a board having a plurality of intersecting guide lines therein corresponding in their arrangement with certain lines on a map and having a plurality of territorial subdivisions marked thereon, a flag for each subdivision, and toy vehicles adapted to be forwarded along said guide lines for the purpose of transferring the flags to their respective subdivisions, the names of the lines being represented on the board indicated by initials.

3. In a game of the character described, a board having a plurality of intersecting guide lines therein corresponding in their arrangement with certain lines on a map and having a plurality of territorial subdivisions marked thereon with holes representing the capitals of the said subdivisions, a flag for each subdivision adapted to be fitted into the holes representing the capital, and toy vehicles adapted to be forwarded along said guide lines for the purpose of transferring the flags to their respective subdivisions.

4. In a game of the character described, a board having a plurality of intersecting guide lines therein corresponding in their arrangement with certain lines on a map and having a plurality of territorial subdivisions marked thereon with holes representing the capitals of the subdivisions, a flag for each subdivision adapted to be fitted into the holes representing the capital, and toy vehicles adapted to be forwarded along said guide lines for the purpose of transferring the flags to their respective subdivisions, the holes representing the capitals being disposed on the guide lines so that flags fitted therein present obstacles to the travel of the toy vehicles.

RICHARD A. CREED.